US012682925B2

(12) United States Patent
Kuroki et al.

(10) Patent No.: US 12,682,925 B2
(45) Date of Patent: Jul. 14, 2026

(54) TAPE HEAD ASSEMBLY WITH PIEZOELECTRIC ACTUATOR

(71) Applicant: Western Digital Technologies, Inc., San Jose, CA (US)

(72) Inventors: Kenji Kuroki, Fujisawa (JP); Koumei Hanaoka, Odawara (JP); Hiroshi Tano, Fujisawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/666,550

(22) Filed: May 16, 2024

(65) Prior Publication Data

US 2025/0356878 A1     Nov. 20, 2025

(51) Int. Cl.
*G11B 5/48*          (2006.01)

(52) U.S. Cl.
CPC ................................. *G11B 5/4893* (2013.01)

(58) Field of Classification Search
CPC ............ G11B 5/48; G11B 5/59; G11B 5/4893
See application file for complete search history.

(56) References Cited

U.S. PATENT DOCUMENTS

| | | | |
|---|---|---|---|
| 5,793,573 A | 8/1998 | Eckberg et al. | |
| 5,862,014 A | 1/1999 | Nute | |
| 5,905,613 A | 5/1999 | Biskeborn et al. | |
| 6,075,678 A * | 6/2000 | Saliba .................. | G11B 21/088 |
| 6,469,860 B1 | 10/2002 | Hedding et al. | |
| 6,781,792 B2 | 8/2004 | Biskeborn | |

| | | | |
|---|---|---|---|
| 7,474,495 B2 | 1/2009 | Weng et al. | |
| 7,518,831 B2 | 4/2009 | Moore et al. | |
| 7,894,161 B2 | 2/2011 | Biskeborn | |
| 7,983,007 B2 | 7/2011 | Tanaka et al. | |
| 8,035,926 B2 * | 10/2011 | Harper .................. | G11B 5/584 |
| | | | 360/291 |
| 8,879,209 B2 | 11/2014 | Biskeborn et al. | |
| 10,783,924 B2 | 9/2020 | Olson et al. | |
| 11,735,223 B2 | 8/2023 | Hanaoka et al. | |

(Continued)

OTHER PUBLICATIONS

Raeymaekers, Bart et al., "Design of a dual stage actuator tape head with high-bandwidth track following capability", Microsystem Technologies, Springer, 2009, vol. 15, pp. 1525-1529, <https://doi.org/10.1007/s00542-009-0800-y>.

(Continued)

*Primary Examiner* — Steven Lim
*Assistant Examiner* — Michelle J. Kim
(74) *Attorney, Agent, or Firm* — Patterson + Sheridan, LLP

(57)          ABSTRACT

The present disclosure generally relates to a tape drive comprising a tape head assembly. The tape head assembly comprises a head block having a first end and a second end, the second end being opposite the first end, one or more tape head modules disposed on the head block, the one or more tape head modules each comprising a plurality of data elements, a first spring disposed at the first end of the head block, a piezoelectric element disposed in contact with the second end of the head block, a counterweight disposed adjacent to the second end of the head block, and a second spring disposed adjacent to the second end of the head block. The counterweight has a first weight. The head block and the one or more tape head modules have a collective second weight. The first weight is equal to or greater than the second weight.

20 Claims, 8 Drawing Sheets

(56) References Cited

U.S. PATENT DOCUMENTS

| | | | |
|---|---|---|---|
| 11,990,164 B1 | 5/2024 | Kuroki et al. | |
| 2014/0078874 A1* | 3/2014 | Madison | G11B 15/1808 |
| 2021/0249042 A1* | 8/2021 | Kobayashi | G11B 25/063 |
| 2021/0343311 A1 | 11/2021 | Brown et al. | |
| 2021/0398558 A1* | 12/2021 | Sakagami | G11B 5/4893 |
| 2022/0415358 A1* | 12/2022 | Hanaoka | G11B 5/584 |

OTHER PUBLICATIONS

Boettcher, Uwe et al., "Dynamic Modeling and Control of a Piezo-Electric Dual-Stage Tape Servo Actuator", IEEE Transactions on Magnetics, Jul. 2009, vol. 45, pp. 3017-3024, <https://ieeexplore.ieee.org/document/5089918>.
Chang, Jen-Yuan, "Mechanics of flexible interconnect in lateral tape open drives", Springer, Jun. 2012, pp. 1-4.

* cited by examiner

TAPE HEAD ASSEMBLY WITH PIEZOELECTRIC ACTUATOR

BACKGROUND OF THE DISCLOSURE

Field of the Disclosure

Embodiments of the present disclosure generally relate to a tape head and a tape drive including a tape head.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

To position the tape head accurately when reading from and writing to a magnetic tape, servo heads are used to read servo positioning information from servo tracks on the tape. The servo tracks comprising the positioning information are written to the tape once, at the media factory, at the beginning of the life of the tape. When the servo track is read, the tape head is positioned accurately on the correct track using a head actuator module and a feedback servo controller against lateral tape motion (LTM) and tape vibration. In order to increase the tracks per inch (TPI) of a tape, off-track write or read operations caused by LTM or vibrations need to be reduced with higher band-width servo control, which requires a faster or higher band-width actuator.

Therefore, there is a need in the art for a tape drive capable of accurate positioning tape heads over a tape dynamically.

SUMMARY OF THE DISCLOSURE

The present disclosure generally relates to a tape drive comprising a tape head assembly. The tape head assembly comprises a head block having a first end and a second end, the second end being opposite the first end, one or more tape head modules disposed on the head block, the one or more tape head modules each comprising a plurality of data elements, a first spring disposed at the first end of the head block, a piezoelectric element disposed in contact with the second end of the head block, a counterweight disposed adjacent to the second end of the head block, and a second spring disposed adjacent to the second end of the head block. The counterweight has a first weight. The head block and the one or more tape head modules have a collective second weight. The first weight is equal to or greater than the second weight.

In one embodiment, a tape head assembly comprises a head block having a first end and a second end, the second end being opposite the first end, one or more tape head modules disposed on the head block, the one or more tape head modules each comprising a plurality of data elements and at least one servo element, a first spring disposed at the first end of the head block, a piezoelectric (PZT) element disposed adjacent to the second end of the head block, a counterweight disposed adjacent to the second end of the head block, and a second spring disposed adjacent to the second end of the head block.

In another embodiment, a tape head assembly comprises a head block having a first end and a second end, the second end being opposite the first end, one or more tape head modules disposed on the head block, the one or more tape head modules each comprising a plurality of data elements and at least one servo element, a first spring disposed at the first end of the head block, a piezoelectric (PZT) element disposed in contact with the second end of the head block, a counterweight disposed adjacent to the PZT element, and a second spring disposed adjacent to counterweight, wherein the counterweight is disposed between the PZT element and the second spring.

In yet another embodiment, a tape head assembly comprises a head block having a first end and a second end, the second end being opposite the first end, one or more tape head modules disposed on the head block, the one or more tape head modules each comprising a plurality of data elements and at least one servo element, a first spring disposed at the first end of the head block, a piezoelectric (PZT) element disposed in contact with the second end of the head block, a second spring disposed adjacent to PZT element, and a counterweight disposed adjacent to the second spring, wherein the second spring is disposed between the PZT element and the counterweight.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a tape drive comprising a tape head assembly. The tape head assembly comprises a head block having a first end and a second end, the second end being opposite the first end, one or more tape head modules disposed on the head block, the one or more tape head modules each comprising a plurality of data elements, a first spring disposed at the first end of the head block, a piezoelectric element disposed in contact with the second end of the head block, a counterweight disposed adjacent to the second end of the head block, and a second spring disposed adjacent to the second end of the head block. The counterweight has a first weight. The head block and the one or more tape head modules have a collective second weight. The first weight is equal to or greater than the second weight.

Figure 1A:
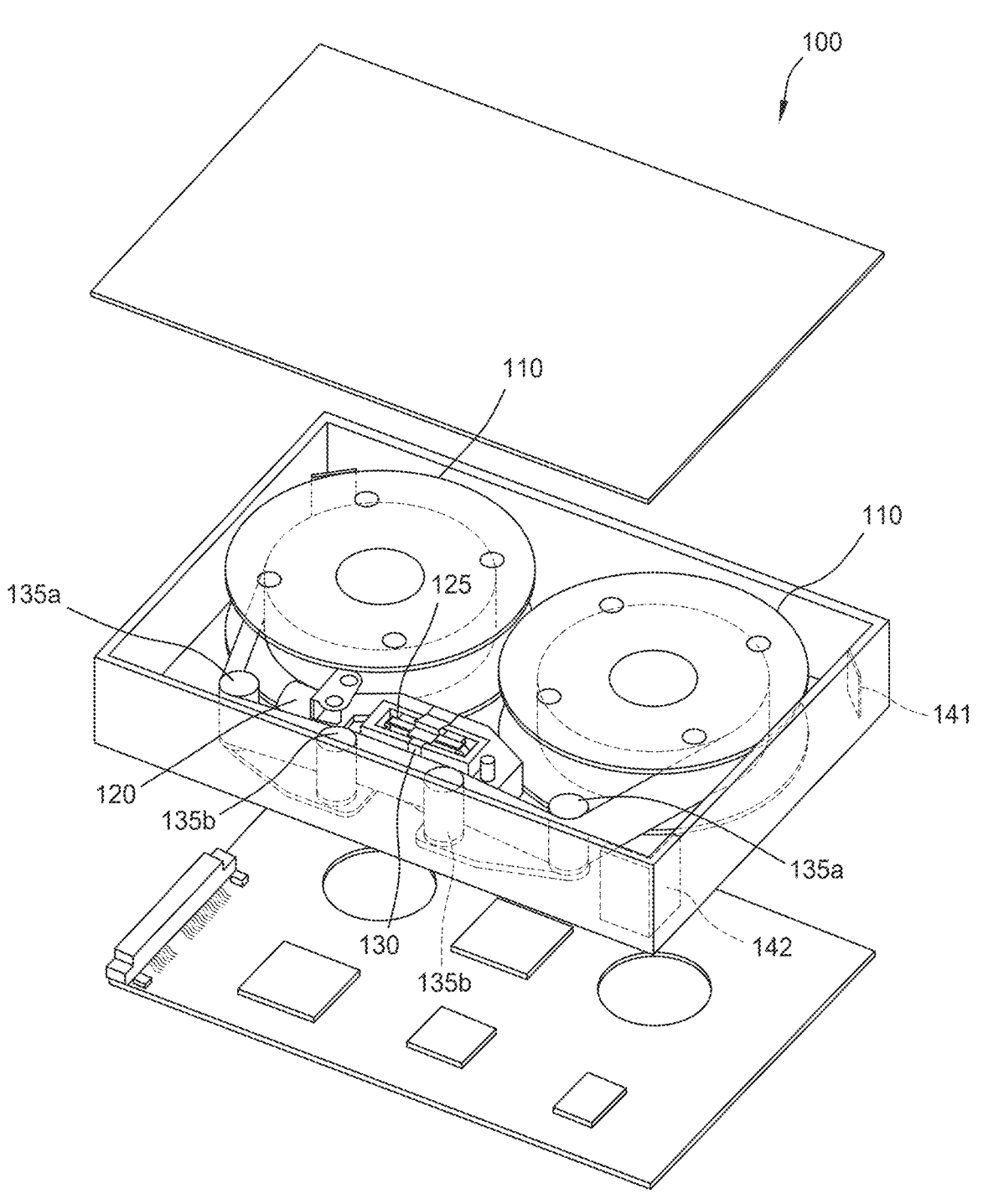
FIGS. 1A-1C illustrate a perspective exploded view, a simplified top down, and side profile view of a tape drive, in accordance with some embodiments.
Figure 1B:
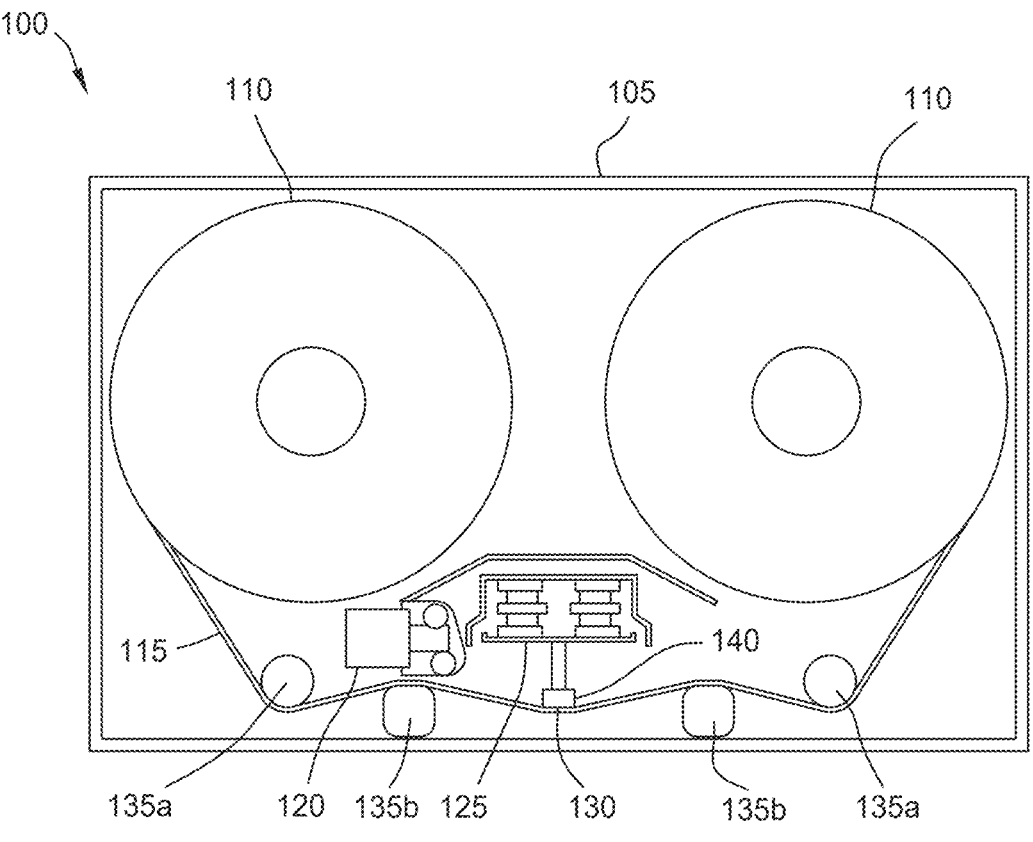
Figure 1C:
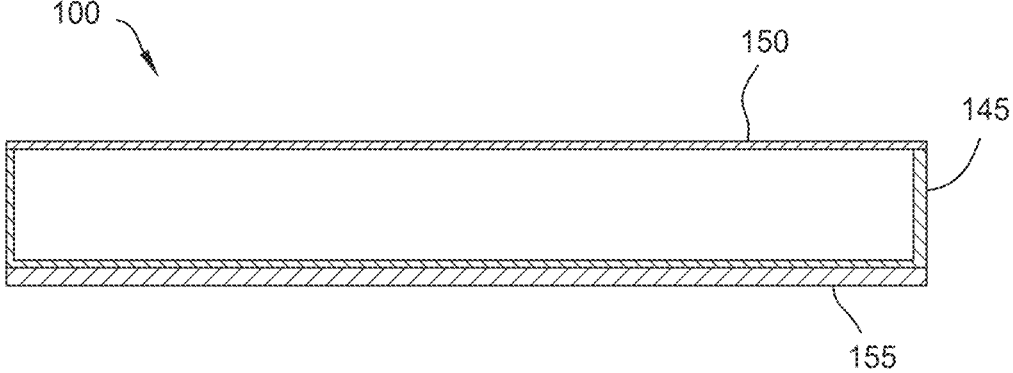

FIGS. 1A-1C illustrate a perspective exploded view, a simplified top down, and side profile view of a tape drive 100, in accordance with some embodiments. The tape drive 100 may be a captive tape drive or a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
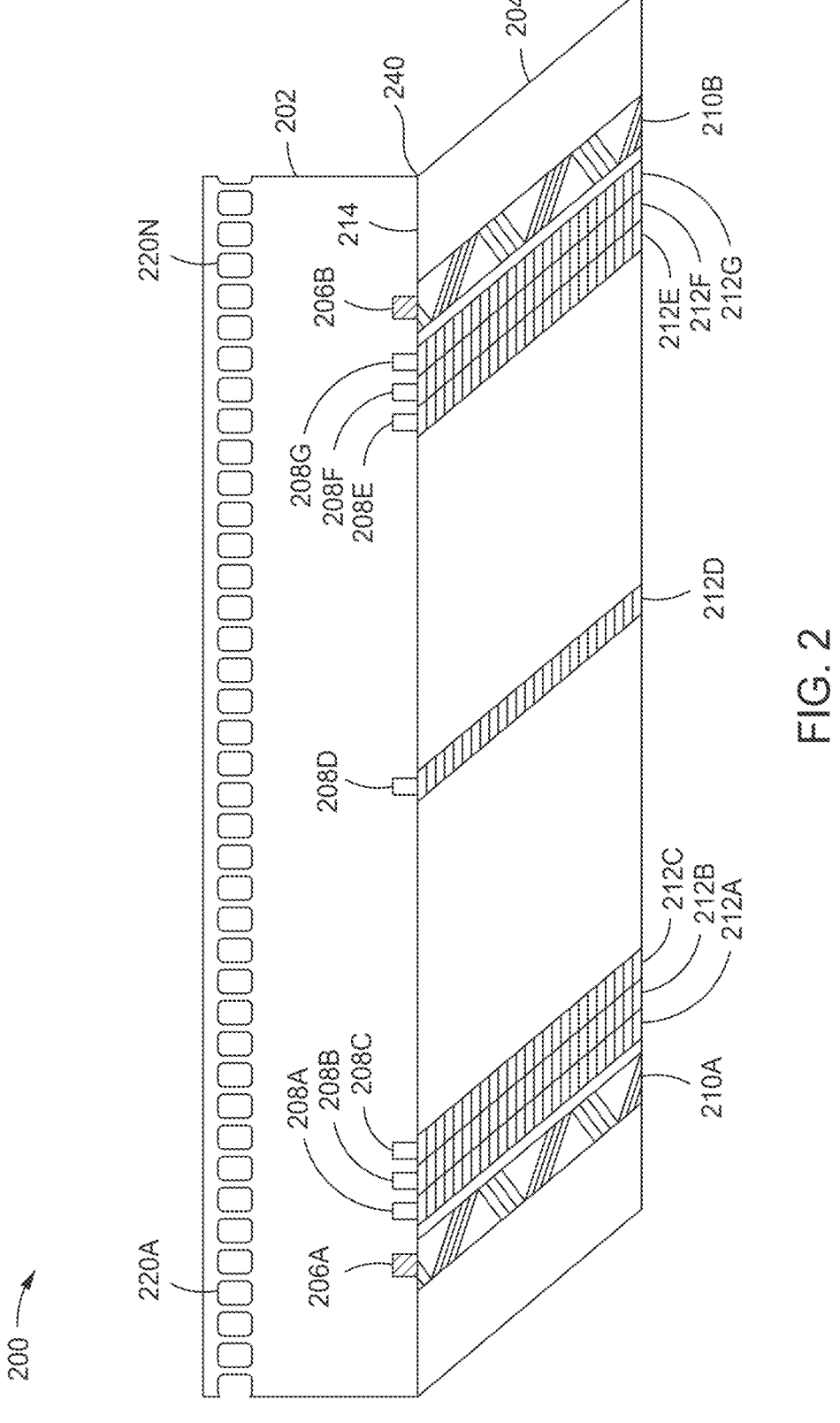
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3A:
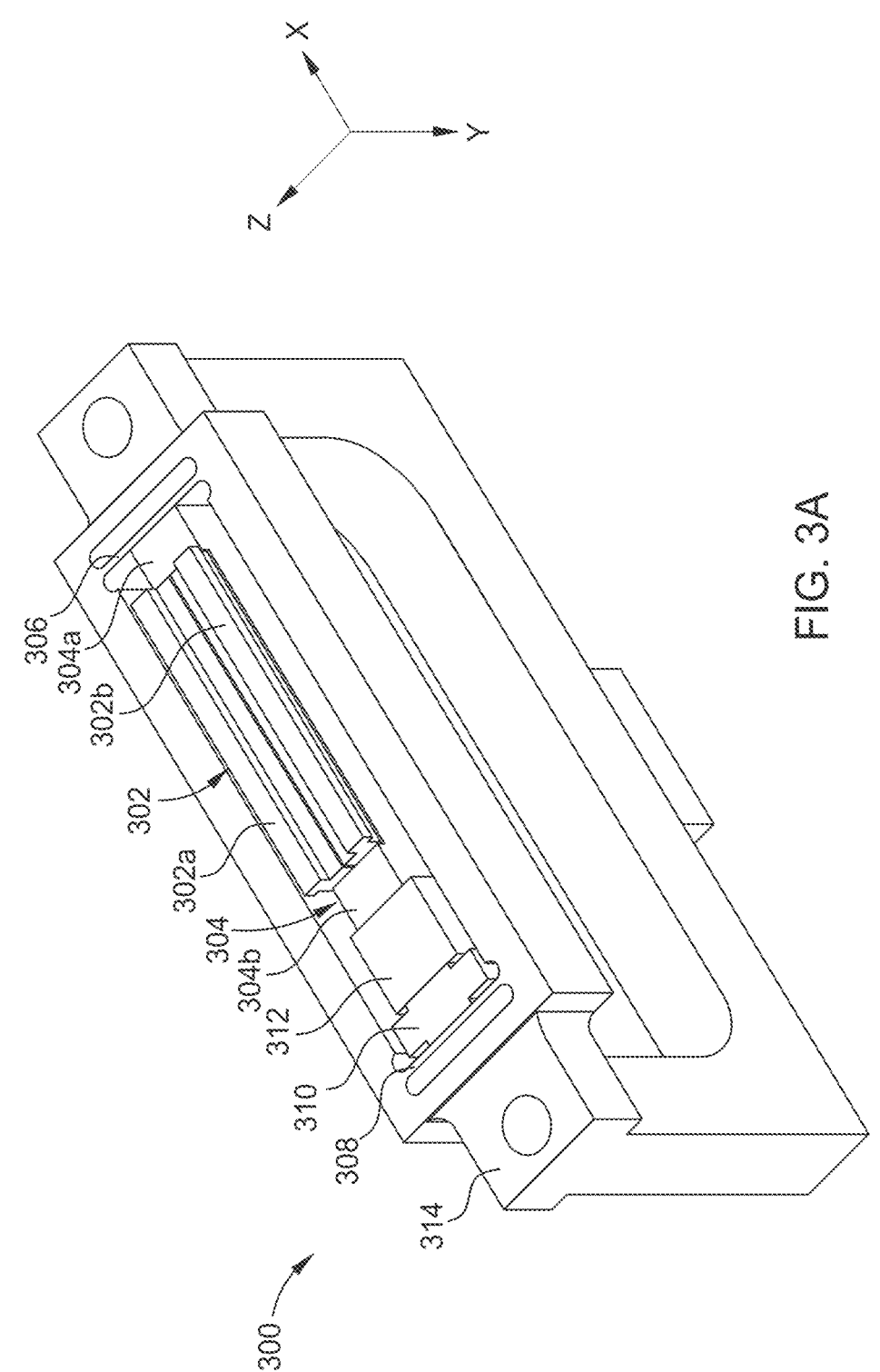
FIGS. 3A-3B illustrate a tape head module of a tape drive, according to one embodiment.
Figure 3B:
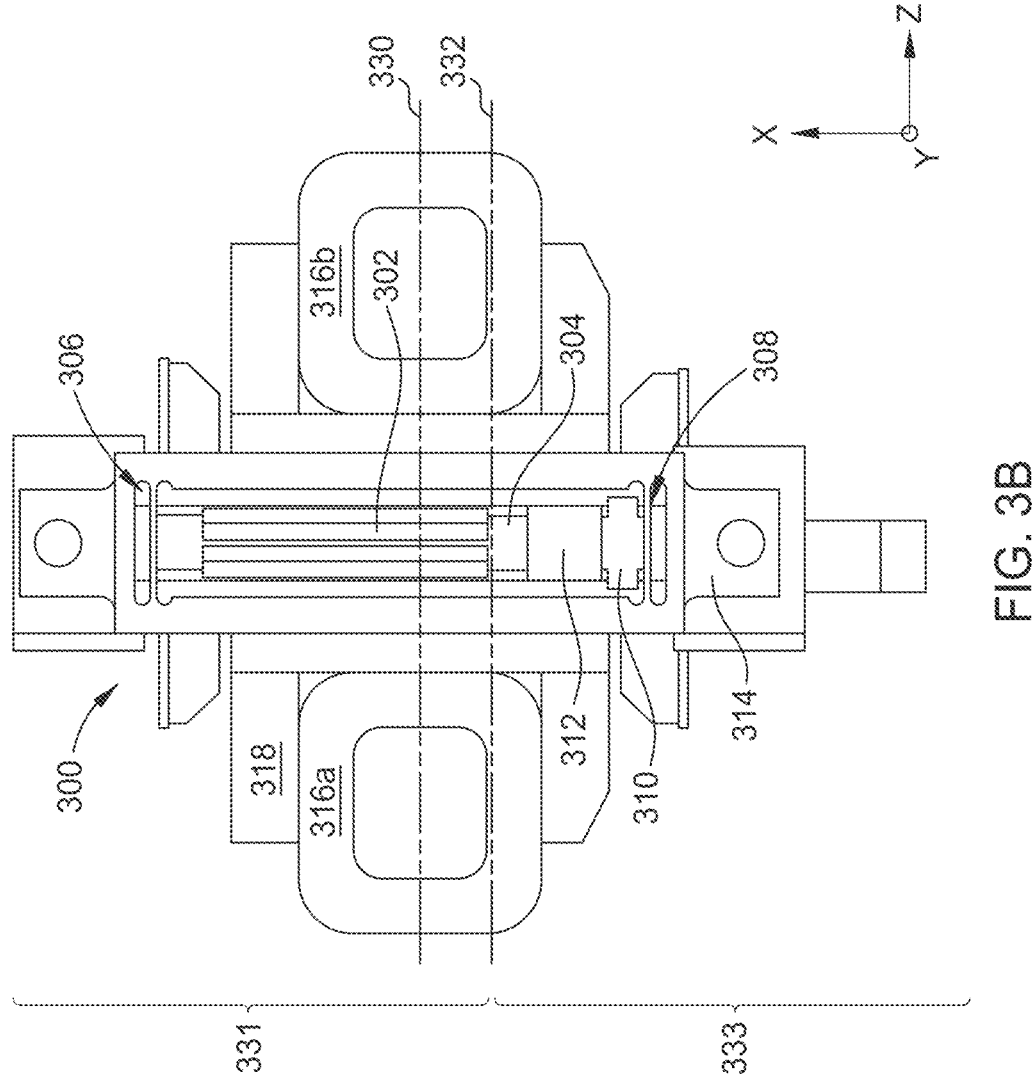
Figure 3C:
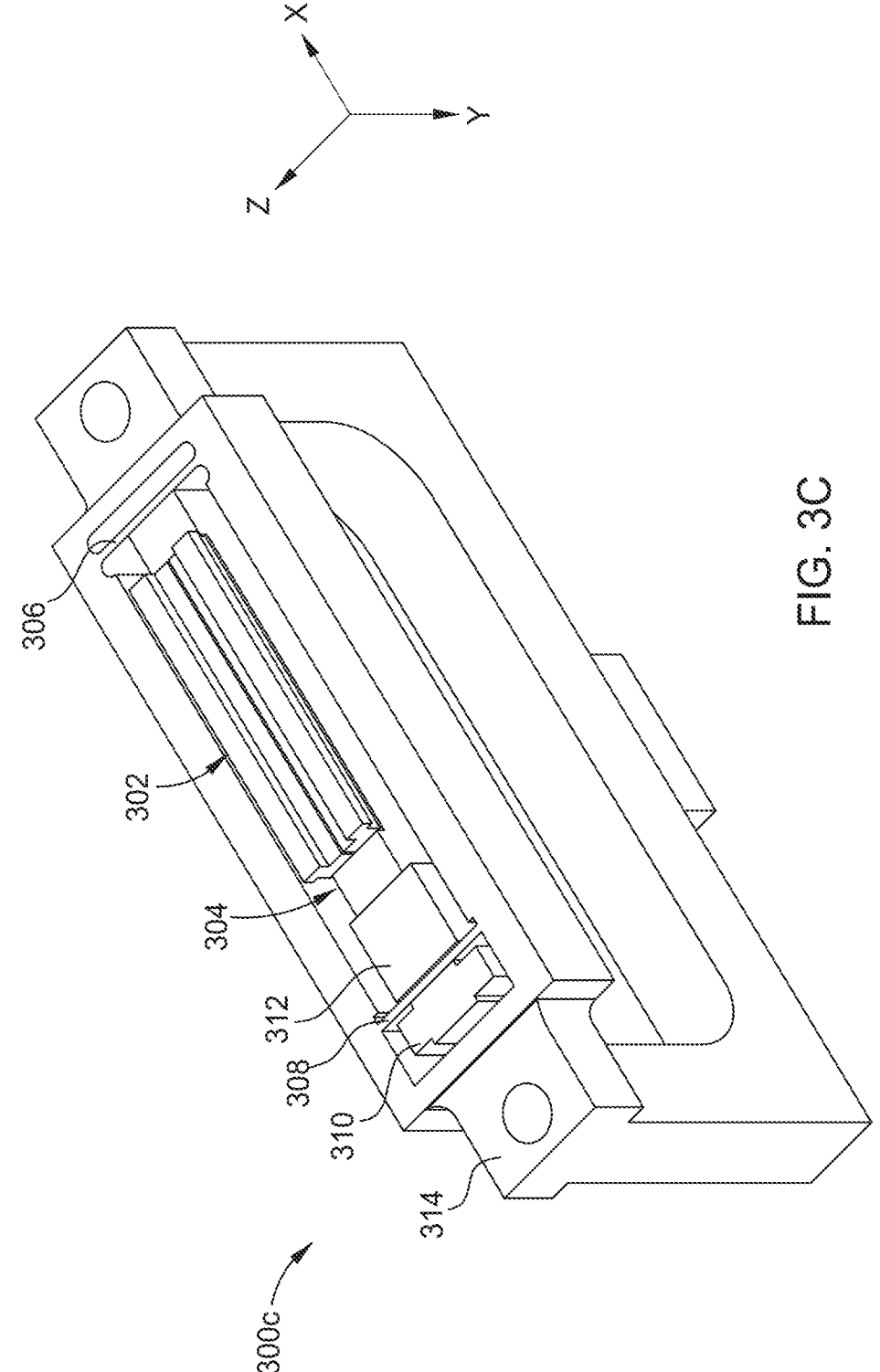
FIG. 3C illustrates a tape head module of the tape drive, according to another embodiment.

FIGS. 3A-3B illustrate a tape head assembly 300, according to one embodiment. FIG. 3C illustrates a tape head assembly 300c, according to another embodiment. The tape head assemblies 300, 300c may each be utilized within a tape drive, such as an LTO tape drive or the tape drive 100 of FIGS. 1A-1C, such as the head assembly 130. Each tape head assembly 300, 300c may include the tape head module 200 of FIG. 2. For simplicity of description, the tape head assemblies 300 and 300c may collectively be described as tape head assembly 300, with differences for tape head assembly 300c noted where applicable.

The tape head assembly 300 comprises one or more tape head modules 302 disposed at an MFS, such as a first tape head module 302a and a second tape head module 302b. Each tape head module 302 comprises a plurality of data heads, such as the data heads 208A-208G of FIG. 2, and one or more servo heads. The data heads may be write heads and/or read heads. The tape head modules 302 are disposed on a head block 304. The head block 304 comprises a first end 304a disposed in contact with a first spring 306, and a second end 304b opposite the first end 304a disposed in contact with a piezoelectric element (PZT) 312. The PZT 312 is disposed in contact with a counterweight 310, and the counterweight 310 is disposed in contact with a second spring 308. The above-mentioned elements of the tape head assembly 300 are disposed within a holder 314 at the MFS.

The counterweight 310 may comprise a heavy metal, such as tungsten or steel, and has a weight about 20 mg to about 2000 mg. In some embodiments, the counterweight 310 weighs more than the tape head modules 302, such as having a weight equal to or greater than about a collective weight of the tape head modules 302 and the head block 304. The collective weight of the PZT 312 and the counterweight 310 may be less than 1.5 times than the collective weight as the tape head modules 302 and the head block 304.

The tape head assembly 300c of FIG. 3C is the same as the tape head assembly 300; however, the second spring 308 is disposed between the counterweight 310 and the PZT 312. In other embodiments, the counterweight 310 is disposed between the head block 304 and the PZT 312. In yet other embodiments, the second spring 308 is optional, and may be excluded.

The PZT 312 is configured to move the head block 304 having the one or more tape head modules 302 disposed thereon in a transversal direction (i.e., the x-direction and −x-direction) of a tape. The PZT 312 enables the one or more tape head modules 302 to be accurately positioned and aligned over the tape during operation. The first and second springs 306, 308 allow the head block 304 and/or tape head modules 302 to move via the PZT 312 a distance of about ±2 μm with a resonance greater than about 20 KHz. In some embodiments, the PZT 312 moves the tape head modules 302 and head block 304 a distance of about 50 nm to about 2 μm. The PZT 312 may be driven by AC voltage.

As shown in FIG. 3B, the holder 314 is coupled to a carriage or carrier 318. One or move VCM actuators 316a, 316b (collectively referred to herein as VCM actuators 316) are coupled to the carrier 318. The VCM actuators 316 are recessed from the MFS. For example, a first VCM actuator 316a and a second VCM actuator 316b may be disposed on either side of the holder 314. In some embodiments, the first VCM actuator 316a is configured to move the tape head assembly 300 in a transversal direction of a tape (about ±500 μm), and the second VCM actuator 316b is configured to rotate or tilt (i.e., in the xz-direction and the x-z-direction) the tape head assembly 300 to align a tape skew (about ±0.5°). In other words, the VCM actuators 316 are configured to coarsely tune the position of the tape head assembly 300 and the PZT 312 is configured to finely tune the position of the tape head modules 302.

Storage capacity increase is primarily achieved by having a higher tracks per inch (TPI) in a tape drive. To increase the TPI, the width of the servo bands or tracks (e.g., such as the first servo track 210A and the second servo track 210B of FIG. 2) is increased. Utilizing the VCM actuators 316 can support a TPI of up to about 20 k, but the servo bandwidth is limited by a resonance of the carrier 318 and the VCM actuators 316. To increase the width of the servo bands, the PZT 312 may be utilized. However, in conventional tape drives that do not comprise a counterweight, the carrier 318 is susceptible to movements or excitations due to a kick back force from the head block 304 when the PZT 312 actuates. As a result, very large vibrations at carrier 318 can limit servo band width.

Conversely, in the disclosed embodiments, the counterweight 310 is able to cancel out the kick back force caused by PZT 312 actuation. Due to the counterweight 310, the upper portion 331 of the tape head assembly 300 comprising the tape head modules 302 (above line 332) and a lower portion 333 of the tape head assembly 300 comprising the PZT 312 and the counterweight 310 (below line 332) have substantially the same weight. In some embodiments, the lower portion 333 has a greater weight than the upper portion 331 by up to about 50%. For example, a collective weight of the PZT 312 and the counterweight 310 is equal to or greater than the collective weight as the tape head modules 302 and the head block 304, where the collective weight of the PZT 312 and the counterweight 310 is about 0% to about 50% heavier than the collective weight as the tape head modules 302 and the head block 304. The collective weight of the PZT 312 and the counterweight 310 may be less than 1.5 times than the collective weight as the tape head modules 302 and the head block 304.

As such, during operation of the PZT 312, the center of weight (line 330) of the tape head assembly 300 does not move, eliminating any kick back or reaction force. The center of weight not moving results in no external force being applied to the VCM actuator 316, which in turn causes no vibrations being passed to the VCM actuator 316.

Figure 4A:
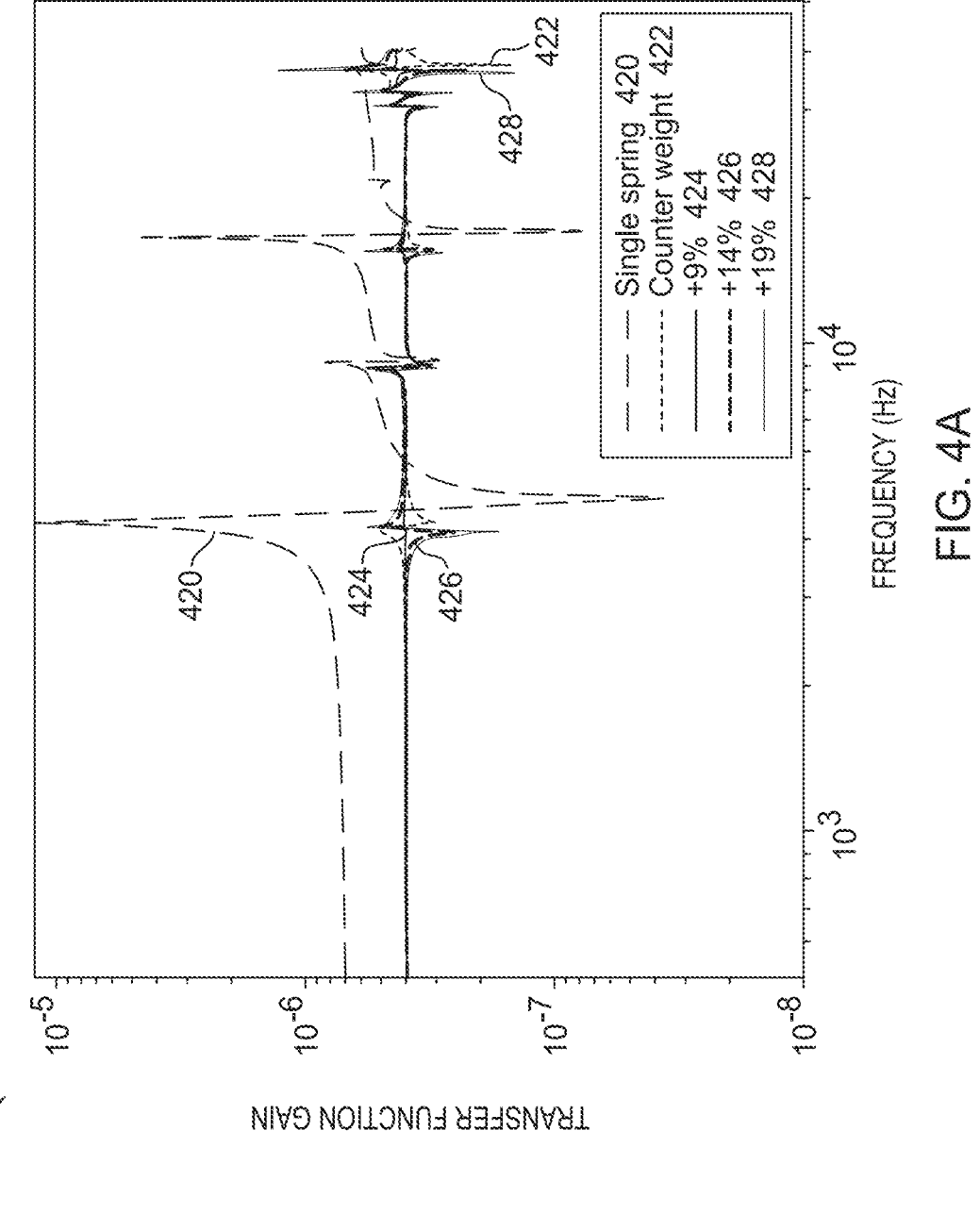
FIG. 4A illustrates a graph of transfer function gain versus frequency in Hz, according to one embodiment.
Figure 4B:
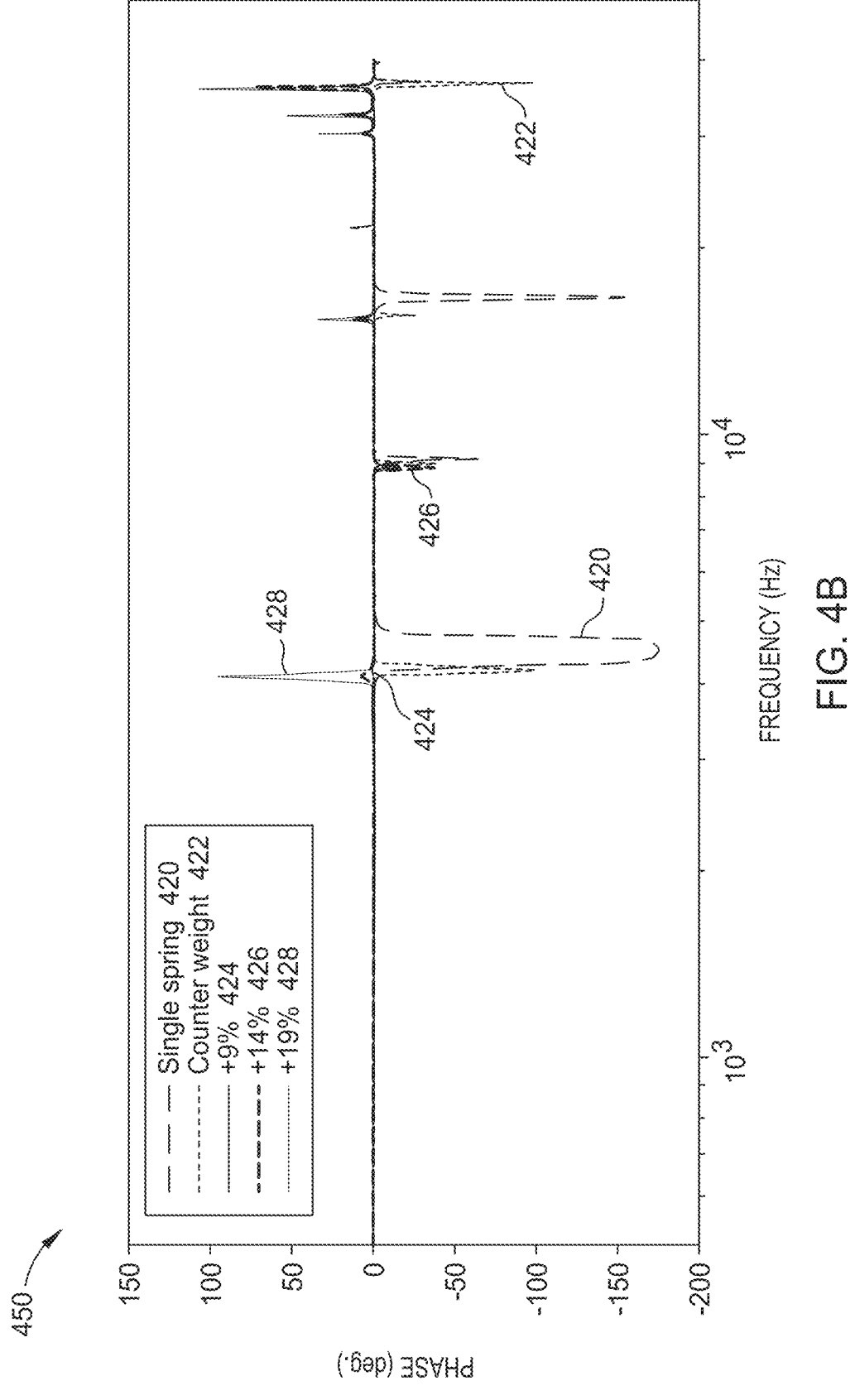
FIG. 4B illustrates a graph of phase delay/gain in degrees versus frequency in Hz, according to one embodiment.

FIG. 4A illustrates a graph 400 of transfer function gain in m versus frequency in Hz, according to one embodiment. FIG. 4B illustrates a graph 450 of phase delay/gain in degrees versus frequency in Hz, according to one embodiment.

When the PZT is driven by AC voltage, the tape head module moves as a function of frequency. The phase is the state of the AC voltage to the PZT, or the state of the head movement caused by the PZT. The phase is described by angles in degree (e.g., 1 cycle=360 degrees). In FIG. 4B, a phase of 0 degrees means the head moves the same phase as the AC voltage. A negative phase means that the head movement is delayed relative to the AC voltage input, which consumes phase margins in a feedback control loop.

In graphs 400, 450, line 420 represents a conventional tape drive having no counterweight and a single spring, line 422 represents a tape drive having a counterweight 310 and two springs 306, 308 where the counterweight 310 weighs about the same as the tape head modules 302 and the head block 304, line 424 represents the tape drive having a counterweight 310 and two springs 306, 308 where the weight of the counterweight 310 has been increased about 9% from line 422, line 426 represents the tape drive having a counterweight 310 and two springs 306, 308 where the weight of the counterweight 310 has been increased about 14% from line 422, and line 428 represents the tape drive having a counterweight 310 and two springs 306, 308 where the weight of the counterweight 310 has been increased about 19% from line 422. The lines 422-428 may represent the performance of a tape drive having the tape head assembly embodiments of FIGS. 3A-3C.

As shown by the graph 400 of FIG. 4A, when the PZT actuates the tape head assemblies, the resonance frequency of a conventional tape drive having no counterweight and a single spring (line 420) has a large amplitude shift, indicating a large amount of kick back or reaction force being applied to the VCM actuator. Conversely, when the PZT 312 of the tape head assembly 300 actuates (lines 422-428), there is very little change in the amplitude of the resonance frequency, indicating little to no kick back or reaction force being applied to the VCM actuator 316, resulting in a flatter gain profile of up to about 20 kHz. As such, the counterweight 310 successfully balances the tape head assembly 300 to cancel out any kick back or reaction force during operation.

As shown by the graph 450 of FIG. 4B, when the PZT actuates the tape head assemblies, the conventional tape drive having no counterweight and a single spring (line 420) has a negative phase delay with a large amplitude. Conversely, when the PZT 312 of the tape head assembly 300 actuates (lines 422-428), there is very little change in the phase. Furthermore, when the weight of the counterweight 310 increases, the phase is positive, as shown by line 428.

Therefore, by utilizing a counterweight disposed adjacent to a PZT in a tape head module, the counterweight is able to cancel out any kick back or reaction force resulting from the PZT actuating. As such, the VCM actuators do no experience any vibrations or negative consequences from kick back force. Because the VCM actuators remain unaffected by the PZT actuations, the width of the servo bands of a tape can be increased, thus increasing the TPI of the tape drive.

In one embodiment, a tape head assembly comprises a head block having a first end and a second end, the second end being opposite the first end, one or more tape head modules disposed on the head block, the one or more tape head modules each comprising a plurality of data elements and at least one servo element, a first spring disposed at the first end of the head block, a piezoelectric (PZT) element disposed adjacent to the second end of the head block, a counterweight disposed adjacent to the second end of the head block, and a second spring disposed adjacent to the second end of the head block.

The PZT element is disposed in contact with the second end of the head block. The counterweight is disposed between the PZT element and the second spring. The second spring is disposed between the PZT element and the counterweight. The counterweight has a first weight, the head block and the one or more tape head modules have a collective second weight, and wherein the first weight is equal to or greater than the second weight. The first weight is up to about 50% greater than the second weight. A tape drive comprises the tape head module, and one or more voice coil motor (VCM) actuators.

In another embodiment, a tape head assembly comprises a head block having a first end and a second end, the second end being opposite the first end, one or more tape head modules disposed on the head block, the one or more tape head modules each comprising a plurality of data elements and at least one servo element, a first spring disposed at the first end of the head block, a piezoelectric (PZT) element disposed in contact with the second end of the head block, a counterweight disposed adjacent to the PZT element, and a second spring disposed adjacent to counterweight, wherein the counterweight is disposed between the PZT element and the second spring.

The counterweight has a first weight, the head block and the one or more tape head modules have a collective second weight, and wherein the first weight is equal to or greater than the second weight. The first weight is up to about 50% greater than the second weight. The first weight is less than 1.5 times than the second weight. The counterweight comprises metal. A tape drive comprises the tape head module, and one or more voice coil motor (VCM) actuators. The PZT element is configured to move the head block and the one or more tape head modules a distance of about 50 nm to about 2 µm in a direction transversal to a tape.

In yet another embodiment, a tape head assembly comprises a head block having a first end and a second end, the second end being opposite the first end, one or more tape head modules disposed on the head block, the one or more tape head modules each comprising a plurality of data elements and at least one servo element, a first spring disposed at the first end of the head block, a piezoelectric (PZT) element disposed in contact with the second end of the head block, a second spring disposed adjacent to PZT element, and a counterweight disposed adjacent to the second spring, wherein the second spring is disposed between the PZT element and the counterweight.

The counterweight has a first weight, the head block and the one or more tape head modules have a collective second weight, and wherein the first weight is equal to or greater than the second weight. The first weight is up to about 50% greater than the second weight, and wherein the first weight is less than 1.5 times than the second weight. A tape drive comprises the tape head module, and one or more voice coil motor (VCM) actuators. The PZT element is configured to move the head block and the one or more tape head modules a distance of about 50 nm to about 2 µm in a direction transversal to a tape. The counterweight cancels out a reactive force of the PZT element.

While the foregoing is directed to embodiments of the present disclosure, other and further embodiments of the disclosure may be devised without departing from the basic scope thereof, and the scope thereof is determined by the claims that follow.

What is claimed is:

1. A tape head assembly, comprising:
   a head block having a first end and a second end, the second end being opposite the first end;
   one or more tape head modules disposed on the head block, the one or more tape head modules each comprising a plurality of data elements;
   a first spring disposed at the first end of the head block;
   a piezoelectric (PZT) element disposed at the second end of the head block;
   a counterweight disposed adjacent to the PZT actuator at the second end of the head block, wherein the counterweight is configured to equalize force caused by the PZT actuator; and
   a second spring disposed adjacent to the second end of the head block.

2. The tape head assembly of claim 1, wherein the PZT element is disposed in contact with the second end of the head block.

3. The tape head assembly of claim 2, wherein the counterweight is disposed between the PZT element and the second spring.

4. The tape head assembly of claim 2, wherein the second spring is disposed between the PZT element and the counterweight.

5. The tape head assembly of claim 1, wherein the counterweight has a first weight, the head block and the one or more tape head modules have a collective second weight, and wherein the first weight is equal to or greater than the second weight.

6. The tape head assembly of claim 5, wherein the first weight is up to about 50% greater than the second weight.

7. A tape drive, comprising:
   the tape head assembly of claim 1; and
   one or more voice coil motor (VCM) actuators.

8. A tape head assembly, comprising:
   a head block having a first end and a second end, the second end being opposite the first end;
   one or more tape head modules disposed on the head block, the one or more tape head modules each comprising a plurality of data elements;
   a first spring disposed at the first end of the head block;
   a piezoelectric (PZT) element disposed in contact with the second end of the head block;
   a counterweight disposed adjacent to the PZT element, wherein the counterweight is configured to equalize force caused by the PZT actuator; and
   a second spring disposed adjacent to counterweight, wherein the counterweight is disposed between the PZT element and the second spring.

9. The tape head assembly of claim 8, wherein the counterweight has a first weight, the head block and the one or more tape head modules have a collective second weight, and wherein the first weight is equal to or greater than the second weight.

10. The tape head assembly of claim 9, wherein the first weight is up to about 50% greater than the second weight.

11. The tape head assembly of claim 9, wherein the first weight is less than 1.5 times than the second weight.

12. The tape head assembly of claim 8, wherein the counterweight comprises metal.

13. A tape drive, comprising:
the tape head assembly of claim 8; and
one or more voice coil motor (VCM) actuators.

14. The tape drive of claim 13, wherein the PZT element is configured to move the head block and the one or more tape head modules a distance of about 50 nm to about 2 μm in a direction transversal to a tape.

15. A tape head assembly, comprising:
a head block having a first end and a second end, the second end being opposite the first end;
one or more tape head modules disposed on the head block, the one or more tape head modules each comprising a plurality of data elements;
a first spring disposed at the first end of the head block;
a piezoelectric (PZT) element disposed in contact with the second end of the head block;
a second spring disposed adjacent to PZT element; and
a counterweight disposed adjacent to the second spring, wherein the second spring is disposed between the PZT element and the counterweight, and wherein the counterweight is configured to equalize force caused by the PZT actuator.

16. The tape head assembly of claim 15, wherein the counterweight has a first weight, the head block and the one or more tape head modules have a collective second weight, and wherein the first weight is equal to or greater than the second weight.

17. The tape head assembly of claim 15, wherein the first weight is up to about 50% greater than the second weight, and wherein the first weight is less than 1.5 times than the second weight.

18. A tape drive, comprising:
the tape head assembly of claim 15; and
one or more voice coil motor (VCM) actuators.

19. The tape drive of claim 18, wherein the PZT element is configured to move the head block and the one or more tape head modules a distance of about 50 nm to about 2 μm in a direction transversal to a tape.

20. The tape drive of claim 18, wherein the counterweight cancels out a reactive force of the PZT element.

*  *  *  *  *